United States Patent [19]  [11] Patent Number: 4,459,847
Kita  [45] Date of Patent: Jul. 17, 1984

[54] VORTEX SHEDDING DEVICE

[75] Inventor: Toru Kita, Yokosuka, Japan

[73] Assignee: Nissan Motor Company, Limited, Kanagawa, Japan

[21] Appl. No.: 322,656

[22] Filed: Nov. 18, 1981

[30] Foreign Application Priority Data

Nov. 19, 1980 [JP] Japan ............................. 55-161865

[51] Int. Cl.³ .............................................. G01F 1/32
[52] U.S. Cl. ................................. 73/118.2; 73/861.22
[58] Field of Search ............ 73/861.22, 861.24, 118 A

[56] References Cited

U.S. PATENT DOCUMENTS 3,996,796 12/1976 Adler et al. ...................... 73/861.22
4,334,426 6/1982 Kita et al. .......................... 73/118 A

FOREIGN PATENT DOCUMENTS 1288797 9/1972 United Kingdom .
1483204 8/1977 United Kingdom .
2032621 5/1980 United Kingdom .

Primary Examiner—Gerald Goldberg
Assistant Examiner—John E. Chapman, Jr.
Attorney, Agent, or Firm—Lowe, King, Price & Becker

[57] ABSTRACT

A vortex shedding device for use in measuring air flow rate into an internal combustion engine includes a duct provided therein with an element for forming vortices in air flowing through the duct. A pair of hot wires is located in the duct which are alternately exposed to vortices generated by the vortex forming element. The hot wires are associated with an electric circuit which detects variations in the resistances of the hot wires and determines the frequency at which vortices are generated in air flowing past the vortex forming element. The electric circuit contains a vortex detector for each of the hot wires so that even if one of the hot wires is broken, a pulse signal is still provided during steady operation of the engine.

6 Claims, 14 Drawing Figures

DIRECTION OF AIR FLOW

VORTEX SHEDDING DEVICE

BACKGROUND OF THE INVENTION

This invention relates to a vortex shedding device for use in measuring the rate at which air flows into the air intake of an internal combustion engine.

Vortex shedding devices have previously been provided for measuring the rate at which air flows into the air intake of internal combustion engine by utilizing a Karman's vortex stream formed in air flowing into the engine air intake. Certain of these vortex shedding devices employ a column located for generating vortices in air flowing into the engine air intake. The column is formed therein with a through-hole in which a hot wire is mounted for detecting the frequency at which vortices are formed. However, such conventional vortex shedding devices suffer from certain disadvantages to be described later.

The present invention provides a vortex shedding device which provides a sufficient resolution power of measurement of the rate at which air flows into an engine and permits automobile steady running even if one of the hot wires is broken.

SUMMARY OF THE INVENTION

There is provided, in accordance with the present invention, a vortex shedding device for use in measuring the rate at which air flows into the air intake of an internal combustion engine. The device comprises a duct connected to the engine air intake, an element mounted within the duct for forming vortices in air flowing through the duct, and first and second hot wires located in the duct and alternately exposed to vortices formed by the vortex forming element. The first and second hot wires have a resistance varying as a function of temperature. The first and second hot wires are associated with circuit means which detects variations in the resistances of the first and second hot wires and determines the frequency or rate at which vortices are generated in air flowing past the vortex forming element.

Since the hot wires are separated from the vortex forming element, the physical size of the vortex forming element can be reduced sufficiently to increase the frequency at which vortices are formed. This increases the frequency of the output signal from the circuit means to thereby increase the resolution power of measurement of intake air flow rate.

In a preferred form, the circuit means comprises first and second vortex detectors for providing voltage signals corresponding to variations in the resistances of the first and second hot wires, respectively, first and second filters for removing DC components from the voltage signals fed thereto from the first and second vortex detectors, respectively, a differential amplifier for amplifying the difference between the output signals from the first and second filters, and a pulse generator for providing a pulse signal the frequency of which corresponds to that of the output signal from the differential amplifier.

Even if one of the hot wires is broken, the measurement of the rate at which air flows to the engine required for steady engine operation can be made by the use of the remaining hot wire. On the other hand, engine operating difficulties occur when the rate of air flow to the engine changes greatly, thereby informing the driver of such hot wire failure. The driver can therefore drive the automobile to a service station where the broken hot wire is replaced by a new one.

BRIEF DESCRIPTION OF THE DRAWINGS

The present invention will be described in greater detail by reference to the following description taken in connection with the accompanying drawings, in which.

DESCRIPTION OF THE PREFERRED EMBODIMENT

Prior to describing the preferred embodiment of the present invention, a prior art vortex shedding device, shown in FIG. 1, will be described in order to specifically point out the difficulties attendant thereon.

Figure 1:
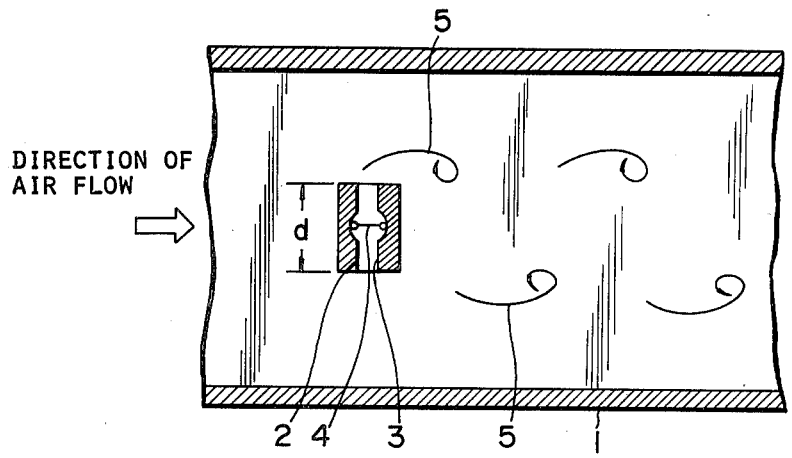
FIG. 1 is a fragmentary longitudinal sectional view showing a part of a prior art vortex shedding device.

Referring to FIG. 1, the conventional vortex shedding device includes a duct 1 connected somewhere midway through the air intake of an internal combustion engine (not shown). A cylindrical element 2 is mounted within the duct 1 and extends transverse to the indicated direction of air flow. The cylindrical element 2 is formed with a through-hole 3 therein within which a hot wire 4 is mounted. As air flows through the duct 1, vortices 5 are formed at the opposite sides of the cylindrical element 2. Upon the formation of each vortex, air flows through the through-hole 3 to cool the hot wire 4 or increase the heat value radiated from the hot wire 4. The frequency or rate at which these vortices are formed, or at which the heat value radiated from the hot wire 4 changes, is proportional to the air velocity and provides an indication of volumetric flow rate. The rate at which the heat value radiated from the hot wire 4 changes is converted into an AC signal, the frequency or period of which is measured to provide an indication of the rate at which air flows into the air intake of the engine.

Figure 2:
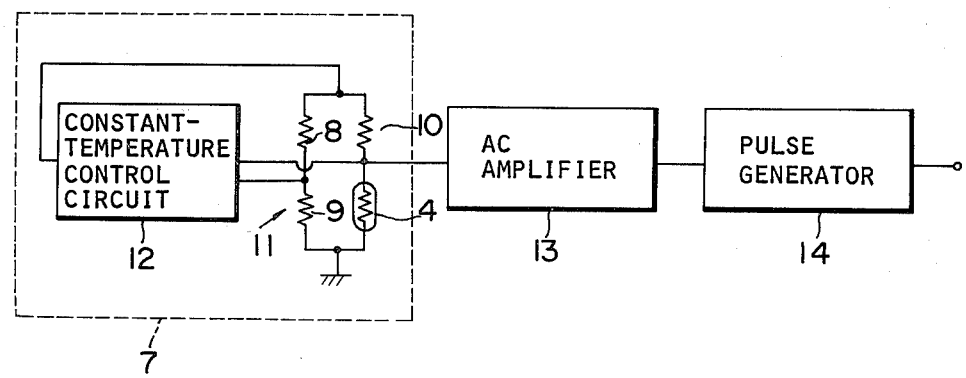
FIG. 2 is a schematic diagram showing an electric circuit used in the prior art vortex shedding device.

Referring to FIG. 2, there is illustrated a conventional electric circuit for converting the rate at which the heat value radiated from the hot wire 4 changes into an AC signal. The circuit comprises a vortex detector 7 which includes a bridge circuit 11 composed of the hot wire 4 and three resistors 8, 9 and 10, and a constant-temperature control circuit 12. The constant-temperature control circuit 12 detects an unbalanced state of the bridge circuit 11 and automatically adjusts the voltage applied across the bridge circuit 11 to hold constant the temperature or resistance value of the hot wire 4. The output signal from the vortex detector 7 is applied to an AC amplifier 13 and hence to a pulse generator 14 where the amplified signal is converted into a pulse signal having a rectangular waveform. The frequency of the pulse signal corresponds to the frequency of formation of the vortices expressed as $f=k.d/v$ wherein v is the air velocity, d is the cylindrical element width perpendicular to the direction of air flow, and k is a constant. A digital indication of the rate of air flow to the engine can be obtained by counting the pulses per unit time.

However, such a conventional vortex shedding device suffers from certain disadvantages. Its cylindrical element, by which vortices are generated in air flowing into the air intake of an engine, is formed with a through-hole provided therein with a hot wire. The cylindrical element accordingly is subject to a minimum size limitation and thus a maximum vortex formation frequency limitation, resulting in failure to provide sufficient resolution power for measurement of the rate of air flow to the engine. Additionally, if it is used as an intake airflow sensor for measuring the rate at which air flows into an automobile engine and the intake air flow rate measurement is used to control the supply of fuel to the engine, the automobile cannot be driven after the hot wire is broken.

With reference now to FIGS. 3 to 6, there is shown one embodiment of a vortex shedding device made in accordance with the present invention for use in measuring the rate at which air flows into the air intake of an internal combustion engine.

Figure 3:
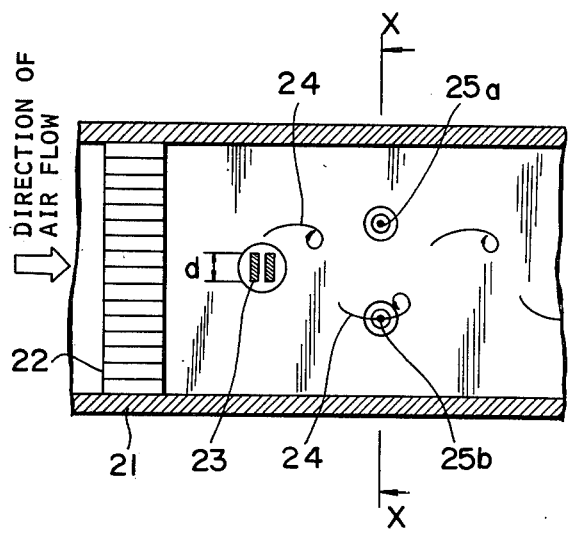
FIG. 3 is a fragmentary longitudinal sectional view showing a part of a vortex shedding device made in accordance with the present invention.
Figure 4:
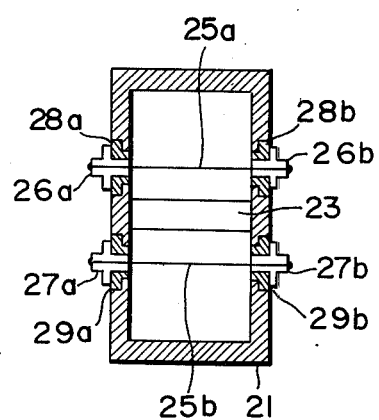
FIG. 4 is a transverse sectional view taken along the line X—X of FIG. 3.

Referring to FIGS. 3 and 4, the vortex shedding device includes a duct 21 which preferably is of rectangular cross-section throughout. The duct 21 is connected somewhere midway through the air intake of the engine so that air can enter the engine through the duct 21. For example, the duct 21 may be connected at its discharge end to a conventional air cleaner (not shown) included in the air intake of the engine. Alternatively, the duct 21 may be connected at the inlet end to the air cleaner. A honeycomb structure 22 may be located within the inlet portion of the duct 21 to regulate the air flow entering the duct 21. The honeycomb structure 22 is effective for eliminating air velocities other than in the general direction of air flow and regulating air stream to the duct 21.

A vortex forming element 23 is mounted within the duct 21 downstream of the honeycomb structure 22 and extends transverse to the indicated direction of air flow. The vortex forming element 23 is shown as comprised of a pair of elongated bars extending in spaced-parallel relation to each other and having a width d. As air flows through the duct 21, vortices 24 are generated from the opposite sides of the vortex forming element 23. The frequency or rate at which these vortices are formed is proportional to the air velocity and provides an indication of volumetric flow rate.

In the paths of travel of the vortices formed in air flowing past the vortex forming element 23, there is located a pair of hot wires 25a and 25b extending transversely of the indicated direction of air flow and symmetrically with respect to the plane parallel with the indicated direction of air flow and including the vortex forming element 23. The hot wire 25a is attached at its opposite ends to terminals 26a and 26b mounted to the duct wall through insulating spacers 28a and 28b. The other hot wire 25b is attached at its opposite ends to terminals 27a and 27b mounted to the duct wall through insulating spacers 29a and 29b. The hot wires 25a and 25b are alternatively exposed to the vortices generated past the vortex forming element 23. The hot wires have a resistance varying as a function of temperature. When exposed to a vortex, each hot wire is cooled and has its resistance varied.

Although in FIGS. 3 and 4 the vortex forming element 23 is comprised of two bars extending in spaced-parallel relation to each other transversely of the direction of air flow, there is no intention to be limited to such a structure. The vortex forming element 23 may be of another structure, such as a single bar, as long as it can generate vortices in air flowing past it. It will be appreciated that the hot wires 25a and 25b may be located at any position within the duct 21 as long as they can alternatively by exposed to vortices formed by the vortex forming element 23.

Figure 5:
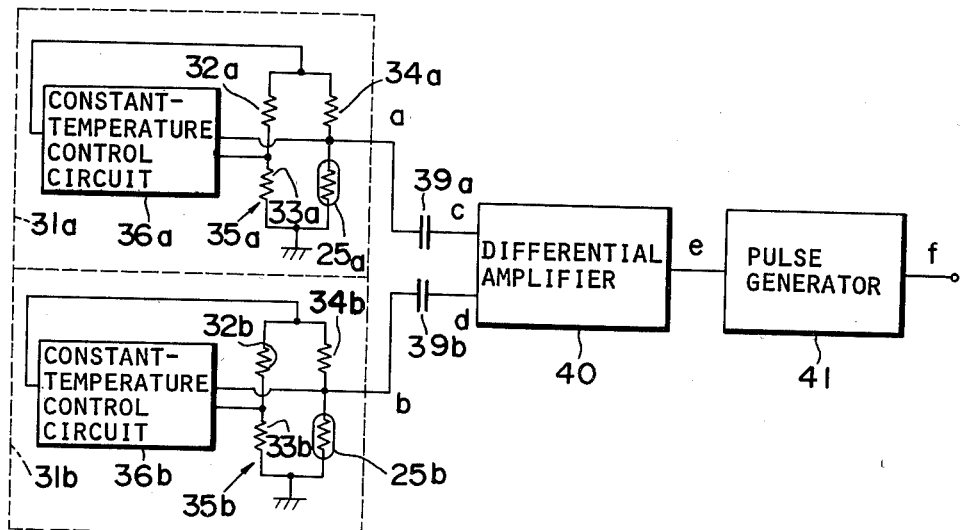
FIG. 5 is a schematic diagram showing an electric circuit used in the vortex shedding device of the present invention.

Referring to FIG. 5, there is shown an electric circuit for use in determining the frequency or rate at which vortices are formed in air flowing past the vortex forming element 23. The electric circuit includes first and second vortex detectors 31a and 31b which are substantially the same in structure. The first vortex detector 31a comprises resistors 32a, 33a and 34a which constitute a bridge circuit 35a together with the hot wire 25a. A constant-temperature control circuit 36a is connected between the junction of the resistors 32a and 33a and the junction of the resistor 34a and the hot wire 25a. The constant-temperature control circuit 36a provides bridge balance to maintain the temperature or resistance of the hot wire 25a at a constant value by controlling the voltage applied between the junction of the resistors 32a and 34a and the junction of the resistor 33a and the hot wire 25a. Similarly, the second vortex detector 31b comprises resistors 32b, 33b and 34b which constitutes, together with the hot wire 25b, a bridge circuit 35b. A constant-temperature control circuit 36b is connected between the junction of the resistors 32b and 33b and the junction of the resistor 34b and the hot wire 25b. The constant-temperature control circuit 36b is effective for controlling the voltage applied between the junction of the resistors 32b and 34b and the junction of the resistor 33b and the hot wire 25b to hold constant the temperature or resistance of the hot wire 25b.

Figure 6:
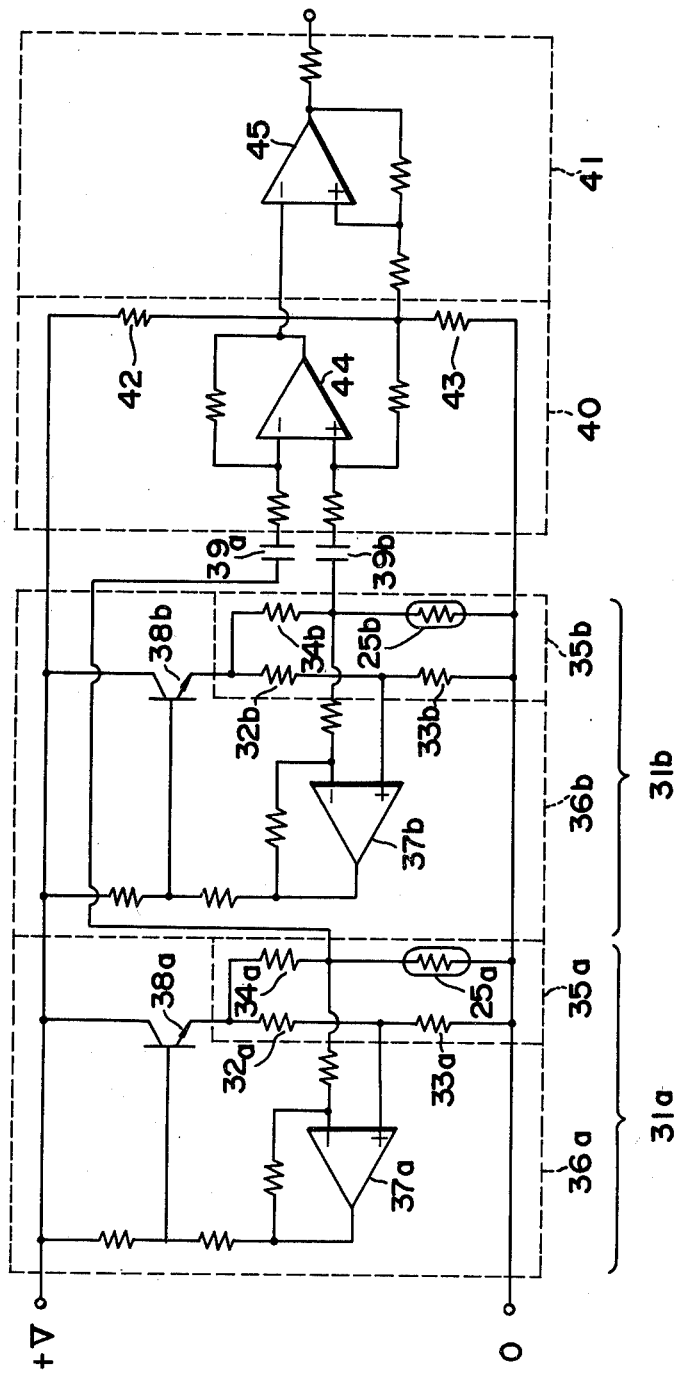
FIG. 6 is a circuit diagram showing the detailed structure of the electric circuit of FIG. 5.

As illustrated in FIG. 6, the constant-temperature control circuit 36a includes a differential amplifier 37a the non-inverting input of which is connected to the junction of the resistors 32a and 33a, the inverting input thereof being connected through a resistor to the junction of the resistor 34a and the hot wire 25a. The output of the differential amplifier 37a is coupled through a resistor to the base of a control transistor 38a which has its emitter-collector circuit connected between the junction of the resistors 32a and 34a and a power supply designated as +V. The differential amplifier 37a amplifies the differential voltage between the junction of the resistors 32a and 33a and the junction of the resistor 34a and the hot wire 25a and applies the amplified voltage, as a negative feedback signal, to the base of the control transistor 38a which thereby controls the voltage applied across the bridge circuit 35a so as to maintain the temperature or resistance of the hot wire 25a at a constant value. The value of heat radiated from the hot wire 25a increases when it is exposed to a vortex formed in air flowing through the duct 21 by the vortex forming element 23. This causes the constant-temperature control circuit 36a to increase the voltage across the bridge circuit 35a or across the hot wire 25a for thereby increasing the temperature of the hot wire 25a.

Similarly, the constant-temperature control circuit 36b includes a differential amplifier 37b having its non-inverting input connected to the junction of the resistors 32b and 33b and its inverting input connected through a resistor to the junction of the resistor 34b and the hot wire 25b. The output of the differential amplifier 37b is coupled through a resistor to the base of a control transistor 38b which has its emitter-collector circuit connected between the junction of the resistors 32b and 34b and the power supply +V. The differential amplifier 37b amplifies the unbalanced voltage appearing between the junction of the resistors 32b and 33b and the junction of the resistor 34b and the hot wire 25b differential amplifier 37b applies the amplified voltage to the base of the control transistor 38b which thereby controls the voltage applied across the bridge circuit 35b so as to maintain constant the temperature or resistance of the hot wire 25b. The quality of heat radiated from the hot wire 25b increases when it is exposed to a vortex generated in air flowing through the duct. This causes the constant-temperature control circuit 36b to increase the voltage across the bridge circuit 35b or across the hot wire 25b for thereby increasing the temperature of the hot wire 25b.

Referring back to FIG. 5, the voltage variations across the hot wire 25a is applied, as an output signal a, from the first vortex detector 31a through a coupling capacitor 39a to one input of a differential amplifier 40. The output signal a contains a DC component which occurs when the hot wire 25a is exposed to the stationary air flow, which is air flow without vortices, through the duct 21, and an AC component which occurs when the hot air is exposed to vortices formed in air flowing through the duct 21. The coupling capacitor 39a is effective for removing the DC component from the output signal a. Thus, the signal c applied to the one input of the differential amplifier 40 is free from the DC component.

The voltage variations across the hot wire 25b is applied, as an output signal b, from the second vortex detector 31b through a coupling capacitor 39b to the other input of the differential amplifier 40. The output signal b contains a DC component which occurs when the hot wire 25b is exposed to the stationary air flow through the duct 21, and an AC component which occurs when the hot wire is exposed to vortices generated in air flowing through the duct 21. The coupling capacitor 39b removes the DC component from the output signal b. Thus, the signal d applied to the other input of the differential amplifier 30 is free from the DC component and contains the AC component only.

It is to be noted that the AC components of the output signals a and b differ in phase by 180° since the hot wires 25a and 25b are alternately exposed to vortices formed from the opposite sides of the vortex forming element 23. The differential amplifier 40 provides an output signal e to a pulse generator 41 which converts the waveform of the signal e into a rectangular waveform. The output signal from the pulse generator 41 is designated as f.

As shown in FIG. 6, the differential amplifier 40 includes an operational amplifier 44 which has its inverting input connected through a resistor to the capacitor 39a and its non-inverting input connected through a resistor to the capacitor 39b. The pulse generator 41 includes an operational amplifier 45 having its inverting input connected to the output of the operational amplifier 44. A voltage divider network comprising resistors 42 and 43 has its one end connected to the power supply +V and the other end thereof being grounded. The non-inverting inputs of the operational amplifiers 44 and 45 are connected through respective resistors to the voltage divider at a point between the resistors 42 and 43.

Figure 7:
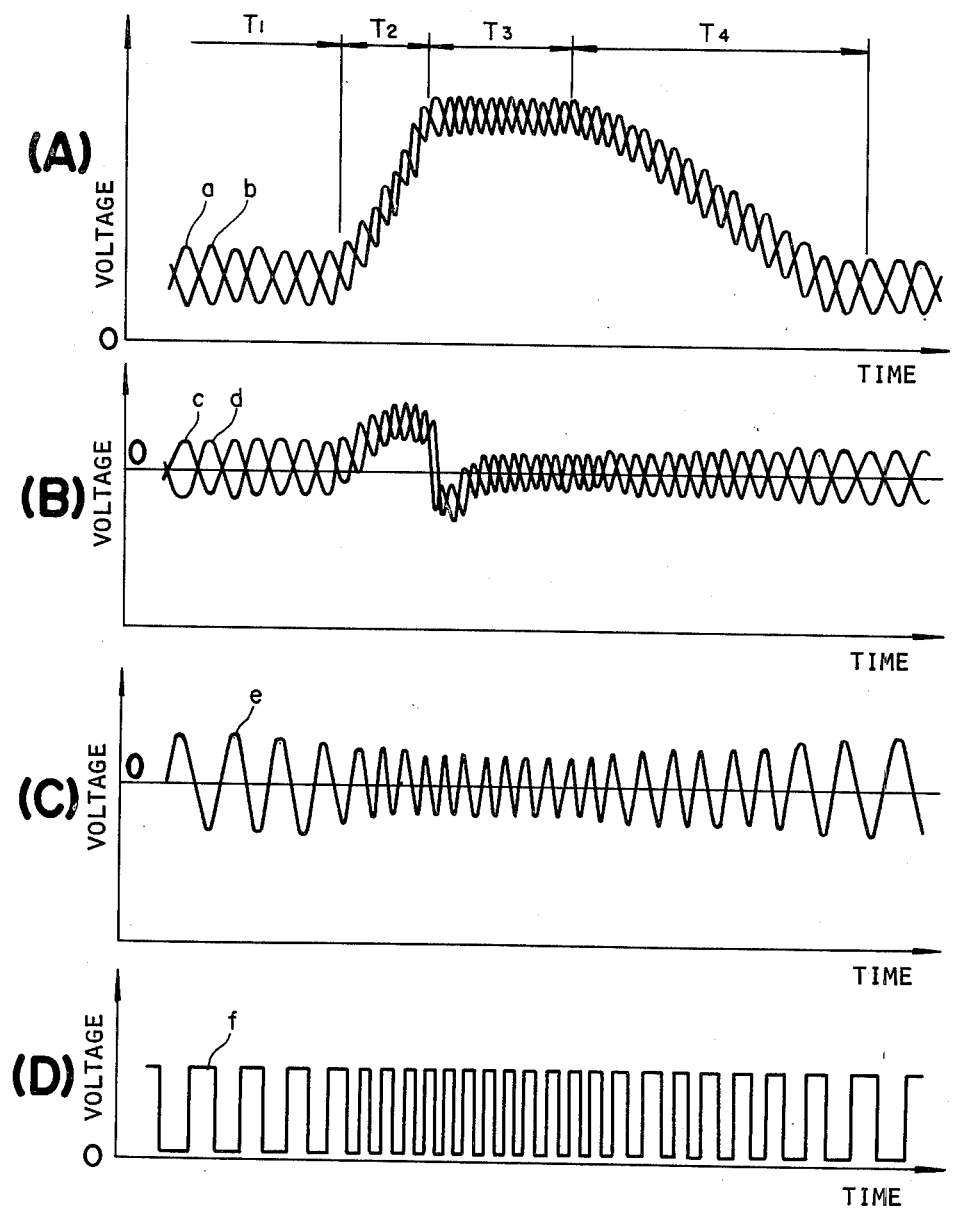
FIG. 7 contains four FIGS. 7A, 7B, 7C and 7D showing waveforms obtained at various points in the schematic diagram of FIG. 5 when the circuit is operating in order.
Figure 8:
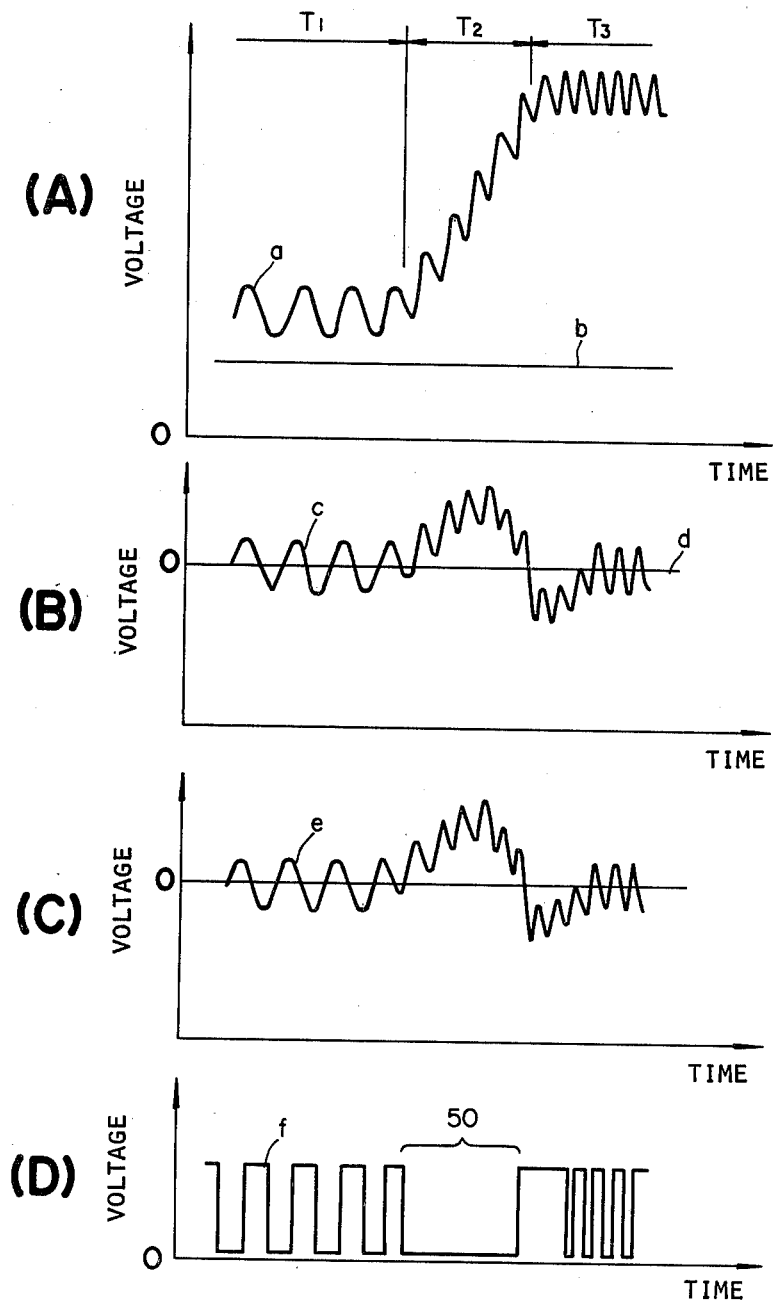
FIG. 8 contains four FIGS. 8A, 8B, 8C and 8D showing waveforms obtained at various points in the schematic diagram of FIG. 5 when one of the hot wires is broken.

Referring to FIGS. 7 and 8, the operation of the vortex shedding device for use in measuring the rate at which air flows into the air intake of an internal combustion engine will be described.

With particular reference now to FIG. 7, there are shown six voltage-versus-time waveforms for the signals a, b, c, d, e, and f, which occur when the first and second vortex detectors 31a and 31b are operating in order. FIGS. 7A, 7B, 7C and 7D are drawn on the same time scale. The letters T1 and T3 indicate the modes where the engine is operating in steady states, the letter T2 indicates an engine acceleration mode, and the letter T4 indicates an engine deceleration mode.

The first and second vortex detectors 31a and 31b provide output signals a and b, as shown in FIG. 7A, which are applied to the differential amplifier 40 through the respective coupling capacitors 39a and 39b. The coupling capacitors 39a and 39b remove the DC components from the signals a and b and provide signals c and d, as shown in FIG. 7B, respectively. This ensures that the operational amplifier 40 can provide a stable AC output signal e having a constant DC level, as shown in FIG. 7C, resulting in accurate vortex detection over the whole range of engine operating modes T1 to T4 even if there is any variation in the heat radiating or vortex sensing characteristics of the hot wires 25a and 25b due to resistance variations thereof and/or soil thereon. Without the use of such coupling capacitors, the differential amplifier 40 will amplify the difference between the DC components of the output signals a and b as well as the difference between the AC components thereof and introduce DC level fluctuations into the output signal e, which results in erroneous vortex detection. The output signal e from the differential amplifier 40 is then applied to the pulse generator 41. The pulse generator 41 provides at its output a pulse signal f, as shown in FIG. 7D, which has a frequency proportional to the rate at which air flows into the air intake of the engine.

With reference to FIG. 8, there are shown six voltage-versus-time waveforms for the signals a, b, c, d, e and f which occur when the hot wire 25b is broken. It is assumed that the engine operates under the same conditions as described in connection with FIG. 7. The letters T1 and T3 indicate the modes where the engine is running in steady states, and the letters T2 indicates an engine acceleration mode.

As can be seen from FIG. 8A, the first vortex detector 31a provides an output signal a having the same waveform as shown in FIG. 7A. Since the broken hot wire 25b has an infinitely great resistance value, the second constant-temperature control circuit 36b minimizes the voltage applied across the bridge circuit 35b. As a result, the second vortex detector 31b provides an output signal b having a constant DC level, as shown in FIG. 8A. It can be seen from FIG. 8B that the signal c, which is the AC component of the signal a, to the one input of the differential amplifier 40 has the same waveform as shown in FIG. 7B, whereas the signal d to the other input of the differential amplifier 40 is held at a constant reference value since the constant DC level of the signal b is blocked by the coupling capacitor 39b. Consequently, the differential amplifier 40 amplifies the AC component of the output signal a from the first vortex detector 31a which is operating in order. The differential amplifier 40 provides an output signal e, as shown in FIG. 8C, to the pulse generator 41 which provides a pulse signal f, as shown in FIG. 8D.

As can be seen from the waveform of the signal f, the vortex shedding device can make measurement of the rate at which air flows into the engine without any trouble during the modes T1 and T3 where the engine is operating under steady conditions. When the rate at which air flows into the engine changes greatly such as during an engine acceleration mode T2, however, the pulse signal f has a portion 50 with no pulses, causing a failure to make intake air flow rate measurement. This provides engine trouble information to the driver so that the driver can know the failure of the hot wire 25b.

There has been provided, in accordance with the present invention, a vortex shedding device for use in measuring the rate at which air flows into the air intake of an internal combustion engine. It includes a pair of hot wires outside a vortex forming element located in a duct connected to the air intake of the engine. The present invention permits the use of a small-sized vortex forming element. This increases the frequency at which vortices are generated or the frequency of the output pulse signal indicative of the intake airflow rate, thereby improving the resolution power of measurement of the rate of air flowing to the engine and the transient characteristics of the engine during rapid acceleration and deceleration. In addition, even if one of the hot wires is broken, m the intake air flow rate measurement required for steady engine operation is assured by the use of the remaining hot wire. Such hot wire failure is communicated to the driver by engine problems occurring when the rate at which air flows to the engine changes greatly. Therefore, the driver can drive the automobile to a service station where the broken hot wire is replaced with a new one.

While the present invention has been described in conjunction with a specific embodiment thereof, it is evident that many alternatives, modifications and variations will be apparent to those skilled in the art. Accordingly, it is intended to embrace all alternatives, modifications and variations that fall within the spirit and broad scope of the appended claims:

What is claimed is:

1. A vortex shedding device for use in measuring the rate at which air flows into the air intake of an internal combusition engine, said device comprising:
   (a) a duct connected to said engine air intake;
   (b) an element mounted within said duct for forming vortices in air flowing though said duct;
   (c) first and second hot wires located in said duct and alternately exposed to vortices formed by said vortex forming element, said first and second hot wires having a resistance varying as a function of temperature; and
   (d) circuit means including:
      a first vortex detector for providing a voltage signal corresponding to variations in said resistance of said first hot wire and independent of variations in said resistance of said second wire;
      a second vortex detector for providing a voltage signal corresponding to variations in said resistance of said second hot wire and independent of variations in said resistance of said first wire;
      a differential amplifier having an input from said first vortex detector and another input from said second vortex detector, said differential amplifier being operable to amplify the difference between the voltage signals from said first and second vortex detectors; and
      a pulse generator for providing a pulse signal having a frequency which corresponds to that of the output signal from said differential amplifier;
      whereby, upon failure of only one of said first and second vortex detectors, said pulse signal is provided during steady state of operation of said engine.

2. A vortex shedding device according to claim 1, wherein said first and second hot wires are located symmetrically with respect to a plane including said vortex forming element.

3. A vortex shedding device according to claim 1, wherein said first vortex detector comprises three resistors constituting a first bridge circuit together with said first hot wire, and a control circuit for controlling the voltage applied across said first bridge circuit to hold the same balanced, and wherein said second vortex detector comprises three resistors constituting a second bridge circuit together with said second hot wire, and a control circuit for controlling the voltage applied across said second bridge circuit to hold the same balanced.

4. A vortex shedding device according to claim 1, wherein said circuit means includes a first filter connected between said first vortex detector and said differential amplifier, said first filter being operable to remove DC components from said voltage signal fed thereto from said first vortex detector, and a second filter connected between said second vortex detector and said differential amplifier, said second filter being operable to remove DC components from said voltage signal fed thereto from said second vortex detector.

5. A vortex shedding device according to claim 4, wherein said first filter comprises a capacitor connected between said first vortex detector and one input of said differential amplifier, and said second filter comprises a capacitor connected between said second vortex detector and another input of said differential amplifier.

6. A vortex shedding device according to claim 4, wherein said first vortex detector comprises three resistors constituting a first bridge circuit together with said first hot wire, and a control circuit for controlling the voltage applied across said first bridge circuit to hold the same balanced, and wherein said second vortex detector comprises three resistors constituting a second bridge circuit together with said second hot wire, and a control circuit for controlling the voltage applied across said second bridge circuit to hold the same balanced.

* * * * *